Feb. 6, 1962 M. S. BURG 3,019,489

METHOD OF MAKING WIRED ELECTRICAL MOUNTING BOARDS

Filed Aug. 9, 1956

INVENTOR
M. S. BURG
BY C. B. Hamilton
ATTORNEY 3,019,489

METHOD OF MAKING WIRED ELECTRICAL MOUNTING BOARDS

Martin S. Burg, Chicago, Ill., assignor to Western Electric Company, Incorporated, New York, N.Y., a corporation of New York Filed Aug. 9, 1956, Ser. No. 603,009
2 Claims. (Cl. 18—59)

This invention relates to encased circuit systems, and more particularly to a method of making wired electrical mounting boards.

An object of the invention is to provide a simple and inexpensive method of making wired electrical mounting boards.

Another object of the invention is to provide new and improved method of making wired electrical mounting boards in which the ends of conductors embedded in the board project from one face of the board at predetermined points thereon so that electrical components may be wired thereto.

A further object of the invention is to provide a method of making wired electrical mounting boards in which the central portions of preformed U-shaped wires are embedded in a cast resin block at different levels so that they may cross one another and the ends of the wires project from one face of the block.

In a method illustrating certain features of the invention, a plurality of wires are formed into a plurality of predetermined shapes with the ends thereof bent transversely of the intermediate portions and the ends of the wires are placed in holes in a recessed master pattern plate and are supported thereby with the intermediate portion of the wires in a predetermined spaced relation to each other and to the plate a dielectric plastic material is poured into the recess over the exposed portion of the wires and solidified to form a block with the intermediate portions of the wires embedded therein after which the block is removed from the plate leaving the ends of the wires projecting from one face of the block.

Other objects and advantages of the invention will be more readily understood by reference to the following detailed description thereof and the accompanying drawings, in which—

Figure 1:
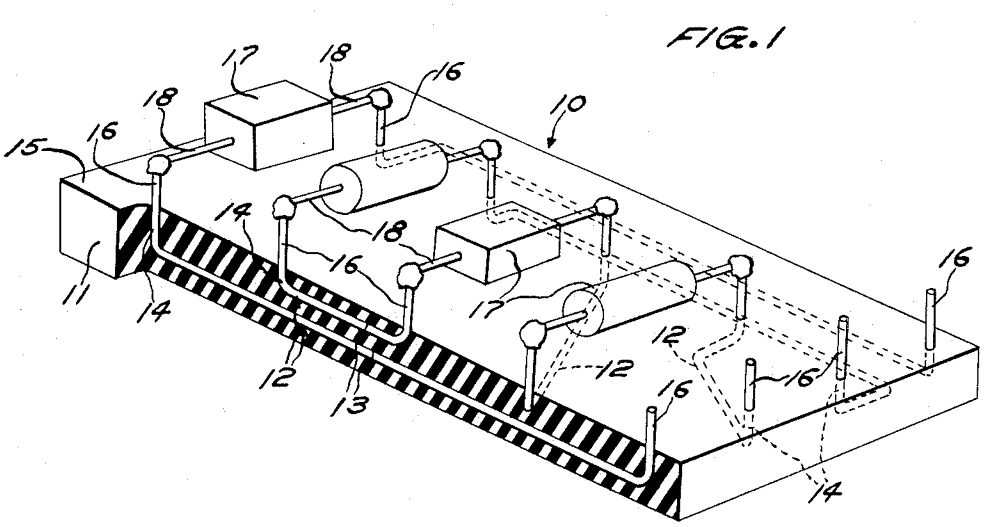
Figure 2:
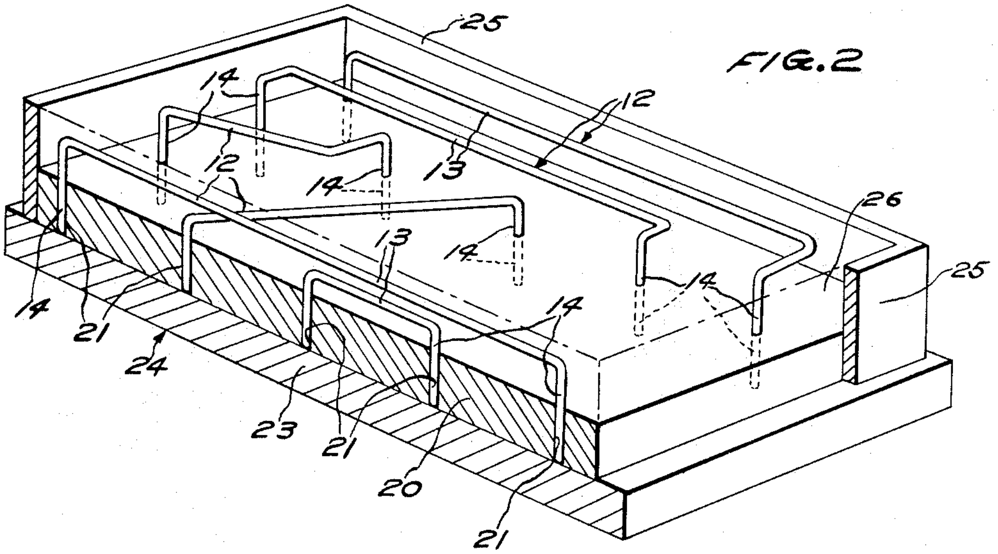

FIG. 1 is a perspective view with portions shown in sections of a wired mounting board with electrical components wired thereto made according to a method forming one embodiment of the invention, and FIG. 2 is a perspective view with portions shown in sections of a device used in forming the wired mounting board.

Referring now in detail to the drawings, there is shown a mounting board 10 which includes a plastic sheet or block 11 having preformed U-shaped stiff wires or conductors 12 provided with central portions 13 embedded in the block 11 and end portions or legs 14 bent at right angles to the central portion and projecting through the block 11 from the upper face 15 thereof to form mounting posts or terminals 16. The wires 12 are preformed into various predetermined shapes and are positioned in predetermined relation to each other with the terminals or mounting posts 16 in predetermined positions for supporting and electrically connecting electrical components 17 which may be capacitors, resistors, varistors and the like. Leads 18 of the components 17 are soldered or otherwise electrically connected to the terminals 16 which are rigid and positioned to firmly support the components in a compact arrangement. Some of the terminals 16 are engageable by connectors (not shown) to connect the circuit components on the mounting board 10 to other circuit components.

In making the wired mounting board, a master plate 20 of a predetermined thickness is provided having a plurality of parallel holes 21 arranged in a predetermined pattern for receiving the ends 14 of the wires 12 herein to support the wires in a predetermined arrangement. The plate 20 is supported on a base plate 23 of an open mold 24 and forms a part thereof. Vertically disposed side walls 25 of the mold enclose the plate 20 and cooperate therewith to define an open mold cavity 26. The ends of the preformed wires 12 are of different predetermined lengths so that when they are placed in their proper positions in the holes 21 in the plate 20 they rest on the base plate 23 and support the intermediate portions 13 of the wires at different levels above the plate 23 in the mold cavity 26 to enable some of the wires to cross others in spaced relation to each other. The portions 13 of the wires may also be formed with loops or other configurations to permit crossing of wires without contact. After the wires 12 have been assembled on the plate 20 as shown in FIG. 2, a plastic compound of electrical insulating material in a liquid or semi-liquid state is poured into the mold cavity to cover and embed the exposed portions of the wires 12 above the plate 20. Any compound suitable for forming strong hard dielectric boards, such as epoxy resin, polyester, polyethylene, polyvinyl chloride, copolymer polyvinyl chloride, and polyvinyl acetate may be used. The plastic material is allowed to set after which the mounting board is removed from the mold and the master plate, and the components 17 are then soldered to the terminals 16.

The ends 14 of the wires are rigid and provide excellent mounting posts 16 for the electrical components 17 and are spaced closely adjacent to the components 17 so that the wires 12 serve to support the components as well as to provide electrical connections between the several components.

The above-described wired board and methods of making them are simple and inexpensive and the boards are strong and durable.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. The method of making wired mounting boards which comprises, forming U-shaped conductors having parallel legs disposed transversely of the intermediate portions of the conductors, placing the conductors successively into an open cavity of a mold and selectively inserting the legs of the conductors into recesses in the bottom of the mold cavity to mask portions of the legs and to support the conductors with the intermediate portions of selected conductors in predetermined spaced and overlying relation to other conductors, and pouring plastic dielectric molding material into the open mold cavity to form a block of dielectric material around the unmasked portions of the conductors.

2. The method of making encased electrical circuit panels which comprises, forming U-shaped conductors having parallel legs disposed transversely of the intermediate portions of said conductors and with the legs of some conductors of different length relative to the legs of other conductors, successively placing the conductors into an open mold cavity and selectively placing the legs of the conductors into recesses in the bottom of the mold cavity to mask portions of the legs and to support the conductors with the intermediate portions of selected conductors in predetermined spaced and overlying relation to other conductors, and pouring plastic dielectric molding material into the open mold cavity to form a block of dielectric material around the unmasked portions of the conductors.

References Cited in the file of this patent

UNITED STATES PATENTS

| | | |
|---|---|---|
| 456,611 | Balsley | July 28, 1891 |
| 1,718,993 | Wermine | July 2, 1929 |
| 1,719,284 | Barnes | July 2, 1929 |
| 1,915,199 | Park | June 20, 1933 |
| 2,066,876 | Carpenter | Jan. 5, 1937 |
| 2,226,734 | McLarn | Dec. 31, 1940 |
| 2,509,701 | Smitch | May 30, 1950 |
| 2,695,351 | Beck | Nov. 23, 1954 |
| 2,707,274 | Kough | Apr. 26, 1955 |
| 2,774,053 | Seger | Dec. 11, 1956 |
| 2,857,583 | Markley | Oct. 21, 1958 |
| 2,876,393 | Tally | Mar. 3, 1959 |